(12) United States Patent
Van Dusen et al.

(10) Patent No.: US 6,361,915 B1
(45) Date of Patent: Mar. 26, 2002

(54) METHOD OF MAKING A CONDUCTIVE MICRO-POWDER RESIN

(75) Inventors: John G. Van Dusen, Walworth; Frederick J. Good, Pittsford, both of NY (US); Vladislav Skorokhod, Mississauga (CA); Suresh K. Ahuja, Webster, NY (US); Michael S. Hawkins, Cambridge (CA)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/722,512

(22) Filed: Nov. 28, 2000

(51) Int. Cl.[7] .................................................. G03G 5/00
(52) U.S. Cl. .................. 430/137.13; 252/511
(58) Field of Search ....................... 430/137.13; 252/511

(56) References Cited

U.S. PATENT DOCUMENTS

| | | |
|---|---|---|
| 3,590,000 A | 6/1971 | Palermiti et al. |
| 4,233,387 A | 11/1980 | Mammino et al. |
| 4,935,326 A | 6/1990 | Creatura et al. |
| 4,937,166 A | 6/1990 | Creatura et al. |
| 5,567,562 A | 10/1996 | Creatura et al. |
| 5,928,830 A | 7/1999 | Cheng et al. |
| 5,958,302 A | 9/1999 | Cunningham et al. |
| 6,042,981 A | 3/2000 | Barbetta et al. |

*Primary Examiner*—Mark Chapman
(74) *Attorney, Agent, or Firm*—Oliff & Berridge, PLC; Eugene O. Palazzo

(57) ABSTRACT

A process for manufacturing a conductive micro-powder includes the steps of: (i) forming an aqueous dispersion of conductive material and the first surfactant, (ii) mixing a latex emulsion of a polymer and a second surfactant into the aqueous dispersion to form a suspension and (iii) recovering the conductive micro-powder from the suspension. The first and second surfactants are of the same class and polarity. The conductive micro-powder finds particular utility as a coating for carrier core particles, and as a conductive coating component of carrier particle coatings.

26 Claims, No Drawings

METHOD OF MAKING A CONDUCTIVE MICRO-POWDER RESIN

BACKGROUND OF THE INVENTION

1. Field of the Invention

This invention relates to a method of making a conductive micro-powder resin. In particular, the invention relates to a novel method of incorporating high amounts of conductive materials into micro-sized resin particles, and the conductive micro-powder resins so obtained. The conductive micro-powder resins find particular utility as a coating for xerographic carriers.

2. Description of Related Art

The electrostatographic process, and particularly the xerographic process, is well known. This process involves the formation of an electrostatic latent image on a photoreceptor, followed by development of the image with a developer, and subsequent transfer of the image to a suitable substrate. Numerous different types of xerographic imaging processes are known wherein, for example, insulative developer particles or conductive developer particles are selected depending on the development systems used. Moreover, of importance with respect to the aforementioned developer compositions is the appropriate triboelectric charging values associated therewith, as it is these values that enable continued formation of developed images of high quality and excellent resolution. In two component developer compositions, carrier particles are used in charging the toner particles.

Carrier particles in part consist of a roughly spherical core, often referred to as the "carrier core," which may be made from a variety of materials. The core is typically coated with a resin. This resin may be made from a polymer or copolymer. The resin may have conductive material or charge enhancing additives incorporated into it to provide the carrier particles with more desirable and consistent triboelectric properties. The resin may be in the form of a powder, which may be used to coat the carrier particle. Often the powder or resin is referred to as the "carrier coating" or "coating."

Prior art methods of incorporating conductive material into carrier coating include the use of electrostatic attraction, mechanical impaction, in situ polymerization, dry-blending, thermal fusion and others. These prior art methods of incorporating conductive material into carrier coatings often result in only minimal amounts of conductive material being incorporated into the coating or produces conductive carrier coatings too large for effective and efficient use in some of the smaller carriers.

XP-454 is a conductive polymer composite manufactured by and proprietary to the Xerox Corporation. It is often used as a conductive powder coating for carriers and is made from a polymethyl methacrylate polymer containing carbon black. It is believed to be made by dispersing the carbon black in an organic solvent and then polymerizing the polymethyl methacrylate therein. See U.S. Pat. No. 5,958,302, incorporated by reference herein in its entirety. This process enables higher amounts of carbon black, ranging from 16% to 24% by weight, to be contained in the resin, but results in particles having a larger size, for example a median diameter size on the order of about 2.0 to 4.0 micrometers. In the process of making XP-454, any surfactant used in the process must be removed by a wash off step. The step of washing off the surfactant is necessary to help control the conductivity and to minimize adverse charging effects due to surfactant contamination.

Other prior art conductive coating resins use dry-blending processes and other mixing to incorporate the carbon black or other conductive material into the polymer. However, in order to avoid transfer of carbon black from conductive polymers so obtained, the amount of carbon black that can be blended is severely limited, e.g., to 10% by weight or less. This in turn severely limits the conductivity achievable by the resultant conductive polymer.

In addition to the problems associated with loading conductive materials into coating resins, recent efforts to advance carrier particle science have focused on the attainment of coatings for carrier particles to improve development quality and provide particles that can be recycled and that do not adversely affect the imaging member in any substantial manner. Many of the present commercial coatings can deteriorate rapidly, especially when selected for a continuous xerographic process where the entire coating may separate from the carrier core in the form of chips or flakes causing failure upon impact or abrasive contact with machine parts and other carrier particles. These flakes or chips, which cannot generally be reclaimed from the developer mixture, have an adverse effect on the triboelectric charging characteristics of the carrier particles, thereby providing images with lower resolution in comparison to those compositions wherein the carrier coatings are retained on the surface of the core substrate.

Further, another problem encountered with some prior art carrier coatings resides in fluctuating triboelectric charging characteristics, particularly with changes in relative humidity. The aforementioned modification in triboelectric charging characteristics provides developed images of lower quality, and with background deposits.

Various coated carrier particles for use in electrostatographic developers are known in the art. Carrier particles for use in the development of electrostatic latent images are described in many patents including, for example U.S. Pat. No. 3,590,000. These carrier particles may consist of various cores, including steel, with a coating thereover of fluoropolymers and terpolymers of styrene, methacrylate, and silane compounds.

There is illustrated in U.S. Pat. No. 4,233,387 coated carrier components for electrostatographic developer mixtures comprised of finely divided toner particles clinging to the surface of the carrier particles. Specifically, there is disclosed in this patent coated carrier particles obtained by mixing carrier core particles of an average diameter of from between about 30 microns to about 1,000 microns, with from about 0.05 percent to about 3.0 percent by weight, based on the weight of the coated carrier particles, of thermoplastic resin particles. The resulting mixture is then dry blended until the thermoplastic resin particles adhere to the carrier core by mechanical impaction, and/or electrostatic attraction. Thereafter, the mixture is heated to a temperature of from about 320° F. to about 6500° F. for a period of 20 minutes to about 120 minutes, enabling the thermoplastic resin particles to melt and fuse on the carrier core. While the developer and carrier particles prepared in accordance with the process of this patent, the disclosure of which is incorporated herein by reference in its entirety, are suitable for their intended purposes, the conductivity values of the resulting particles are not constant in all instances, for example, when a change in carrier coating weight is accomplished to achieve a modification of the triboelectric charging characteristics. Further in regard to U.S. Pat. No. 4,233,387, in many situations carrier and developer mixtures with only specific triboelectric charging values can be generated when certain conductivity values or characteristics are contemplated.

U.S. Pat. No. 4,937,166, incorporated by reference herein in its entirety, describes a carrier composition comprised of a core with a coating thereover comprised of a mixture of first and second polymers that are not in close proximity thereto in the triboelectric series. The core is described to be iron, ferrites, steel or nickel. The first and second polymers are selected from the group consisting of polystyrene and tetrafluoroethylene; polyethylene and tetrafluoroethylene; polyethylene and polyvinyl chloride; polyvinyl acetate and tetrafluoroethylene; polyvinyl acetate and polyvinyl chloride; polyvinyl acetate and polystyrene; and polyvinyl acetate and polymethyl methacrylate. The particles are described to have a triboelectric charging value of from about −5 to about −80 microcoulombs per gram.

U.S. Pat. No. 4,935,326, incorporated by reference herein in its entirety, discloses a carrier and developer composition, and a process for the preparation of carrier particles with substantially stable conductivity parameters which comprises (1) providing carrier cores and a polymer mixture; (2) dry mixing the cores and the polymer mixture; (3) heating the carrier core particles and polymer mixture, whereby the polymer mixture melts and fuses to the carrier core particles; and (4) thereafter cooling the resulting coated carrier particles. These particulate carriers for electrophotographic toners are described to be comprised of core particles with a coating thereover comprised of a fused film of a mixture of first and second polymers which are not in close proximity in the triboelectric series, the mixture being selected from the group consisting of polyvinylidenefluoride and polyethylene; polymethyl methacrylate and copolyethylene vinyl acetate; copolyvinylidenefluoride tetrafluoroethylene and polyethylenes; copolyvinylidenefluoride tetrafluoroethylene and copolyethylene vinyl acetate; and polymethyl methacrylate and polyvinylidenefluoride.

U.S. Pat. No. 5,567,562, incorporated by reference herein in its entirety, describes a process for the preparation of conductive carrier particles which comprises mixing a carrier core with a first polymer pair and a second polymer pair, heating the mixture, and cooling the mixture, wherein the first and second polymer pair each contain an insulating polymer and a conductive polymer and wherein the carrier conductivity thereof is from about $10^{-6}$ to about $10^{-14}$ (ohm-cm)$^{-1}$. The first polymer pair is preferably comprised of an insulating polymethyl methacrylate and a conductive polymethyl methacrylate, and the second polymer pair is preferably comprised of an insulating polyvinylidenefluoride and a conductive polyvinylidenefluoride.

There is illustrated in U.S. Pat. No. 6,042,981, incorporated by reference herein in its entirety, carriers including a polymer coating wherein the polymer coating may contain a conductive component, such as carbon black, and which conductive component, is preferably dispersed in the polymer coating. The conductive component is incorporated into the polymer coating of the carrier core by combining the carrier core, polymer coating, and the conductive component in a mixing process such as cascade roll mixing, tumbling, milling, shaking, electrostatic powder cloud spraying, fluidized bed, electrostatic disc processing or by an electrostatic curtain. After the mixing process, heating is initiated to coat the carrier core with the polymer coating and conductive component.

There are illustrated in U.S. Pat. No. 5,928,830, incorporated by reference herein in its entirety, processes for the preparation of black and color toner compositions. This toner is prepared from latex comprised of a polymer core and a polymer shell thereover. The latex is fused or coalesced together forming toner particles comprised of an aggregation of the latex. Conductive or pigment components may incorporated into the latex cores/shell, prior to coalescence, by blending a dispersion of the conductive or pigment component in a cationic surfactant with the latex core/shell in an ionic or non-ionic surfactant. Specific examples of conductive components incorporated in U.S. Pat. No. 5,928,830 include conductive carbon black SC Ultra available from Conductex Inc. and antimony-doped tin oxide Zelec ECP3005-XC manufactured by E. I. DuPont.

U.S. Pat. No. 5,928,830 describes an emulsion process for forming colored toner particles in which both cationic and anionic surfactants are utilized in forming the colored toner particles. Anionic surfactants include sodium dodecylsulfate (SDS), sodium dodecylbenzene sulfonate, sodium dodecylnaphthalene sulfate, sodium tetrapropyl diphenyloxide disulfonate, dialkyl benzenealkyl, sulfates and sulfonates, abitic acid, available from Aldrich, NEOGEN®, NEOGEN SC™, obtained from Kao, Biosoft D-40™, obtained from Stepan and Dowfax 2A1™ obtained from Dow Chemical. Cationic surfactants used in U.S. Pat. No. 5,928,830 include dialkyl benzenealkyl ammonium chloride, lauryl trimethyl ammonium chloride, alkylbenzyl methyl ammonium chloride, alkyl benzyl dimethyl, ammonium bromide, benzalkonium bromides, halide salts of quaternized polyoxyethylalkylamines, dodecylbenzyl triethyl ammonium chloride, MIRAPOL™ and ALKAQUAT™ available from Alkaril Chemical Company, SANIZOL™ (benzalkonium chloride), available from Kao Chemicals, and the like, in effective amounts of, for example, from about 0.01 percent to about 10 percent by weight.

This patent also describes the use of surfactants which can be added to the latex core/shell mixture, preferably prior to the coalescence, to form the aggregate toner particles. Such surfactants can be selected from anionic surfactants, such as for example sodium dodecylbenzene sulfonate, sodium dodecylnaphthalene sulfate, sodium tetrapropyl diphenyloxide disulfonate, dialkyl benzenealkyl, sulfates and sulfonates, abitic acid, available from Aldrich, NEOGEN®. NEOGEN SC™ obtained from Kao, Biosoft D-40™, obtained from Stepan, Dowfax 2A1™ obtained from Dow Chemical and the like. The surfactant used in the coalescence stage of the invention include nonionic surfactants such as polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethylenoxy) ethanol, available from Rhone-Poulenac as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™. An effective amount of the anionic or nonionic surfactant utilized in the coalescence to stabilize the aggregate size against further growth or to minimize further growth with temperature is, for example, from about 0.01 to about 10 percent by weight, and preferably from about 0.5 to about 5 percent by weight of reaction mixture.

As described above, there is a continuous need to be able to incorporate high amounts of conductive material into coating resins for xerographic carrier in an efficient manner providing for coatings with excellent xerographic properties.

SUMMARY OF THE INVENTION

It is an object of the invention to develop an efficient and reliable process capable of achieving very small size particles of polymers with high loadings of conductive material.

It is a further object of the invention to develop an efficient and reliable process for manufacturing conductive micro-powder coating resins for xerographic carriers possessing excellent xerographic properties for use in developer compositions.

These and other objects of the present invention are achieved herein. In the process of this invention, an aqueous dispersion including conductive pigments and a first surfactant is formed. Next, a latex of the polymer matrix of the powder, including a second surfactant, is mixed into the dispersion to form a suspension of conductive material and latex. The first and second surfactant are generally of the same type and class. Finally, small size conductive particles may be recovered by freeze drying or by spray dying of the resulting suspension, and are typically smaller than one micron in particle size.

These small size conductive particles are particularly useful in electrostatographic devices. Conductive micro-powder coating resins prepared by this process have excellent and unique properties ideally suited for particular use in coating carrier particles of a developer for an electrostatographic printing device. These conductive micro-powder resins provide improved coating coverage of the carrier. Carriers coated with these sub-micron sized conductive resins provide superior triboelectric charging capabilities.

DETAILED DESCRIPTION OF PREFERRED EMBODIMENTS

The present invention incorporates high amounts of conductive material into the powder used for carrier coating using a novel method. The conductive powder is made from the recovered particles of a suspension comprising: (1) a latex emulsion of a copolymer containing a first surfactant and (2) a dispersion of a conductive material and a second surfactant.

The present invention provides a process for the preparation of conductive micro-powder resin comprising 1) forming an aqueous dispersion of at least one conductive material and a first surfactant, 2) mixing in a latex emulsion comprised of a polymer and a second surfactant to form a suspension, and 3) recovering the submicron sized polymer powder containing conductive material from the suspension, wherein the first and second surfactant are of the same class and polarity.

The conductive micro-powder resin of the present invention finds particular utility in a variety of xerographic copiers and printers, such as high speed xerographic color copiers, printers, digital copiers and more specifically, wherein color copies with excellent and substantially no background deposits are desirable in copiers, printers, digital copiers, and the combination of xerographic copiers and digital systems.

The conductive material described can be any suitable material exhibiting conductivity, e.g., metal oxides, metals, carbon black, etc. In a most preferred embodiment, carbon black is the conductive material. As an example, carbon black marketed by the Cabot Corporation under the trademark VULCAN #XC72R may be suitable. VULCAN #XC72R is a 30nm nanometer carbon black with surface area of 200–300 meter$^2$/gram, generally used in conductive composite applications.

The aqueous dispersion containing the conductive material may be formed by mixing the conductive material in water with a first surfactant. The water may be distilled, or deionized. The amount of conductive material incorporated in the dispersion depends on the conductivity desired in the end conductive polymer. The amount of conductive material incorporated in the dispersion may be about 12% to about 60% by weight of the dispersion. Preferably, the amount of conductive material added to the dispersion may be about 20% to about 35% by weight of the dispersion. In a most desirable embodiment of the present invention, the amount of conductive material added to the dispersion may be about 30% by weight of the dispersion, which achieves conductivity that is close to that of typical carrier core materials.

The recovered micro-powder contains the same prefered ranges of conductive filler as incorporated in the suspension process, i.e., the recovered micro-powder may contain about 12% to about 60% by weight conductive filler.

The first surfactant of the dispersion may be added to the dispersion in an amount of, for example, about 0.5% to about 5.0% by weight of the dispersion.

Preferred surfactants are of the anionic type. Suitable surfactants include, for example, sodium dodecylbenzene sulfonate, dodecyl sulfate-sodium salt, dodecylnapthalene sulfate, and others. Most preferably, no other surfactants of a different class or polarity are present. An expecially preferred surfactant is dodecyl sulfate-sodium salt.

The dispersion is formed by mixing the materials at a rate of, for example, about 50 to about 300 revolutions per minute for about 1 to 6 hours using any mechanical mixing apparatus well known in the art. Preferably, the dispersion is mixed at a rate of about 100 to about 200 revolutions per minute for about 2 to 4 hours. In a most preferred embodiment, the dispersion is mixed at about 150 revolutions per minute for about 3 hours.

After the dispersion of surfactant and conductive material is formed, the latex emulsion is added slowly and at a constant rate, to form a stable suspension.

The polymer particles for the carrier coating of the present invention are most preferably made via emulsion polymerization. This particular method of polymerization is well known and has been thoroughly described in many patents. See, for example, U.S. Pat. No. 6,042,981, incorporated herein by reference. Emulsion polymerization is most typically accomplished by the continuous addition of monomer to a suitable reaction vessel containing water. The reaction vessel is provided with stirring means, and also optionally, nitrogen atmosphere and thermostatic control. The polymerization is affected by heating to, for example, between about 40° C. and about 100° C.

The present invention utilizes surfactants in the conductive dispersion and latex emulsion. The surfactants aid in the development of the polymer particles for the conductive micro-powder resin.

The latex emulsion is thus formed by polymerizing monomers in an aqueous dispersion with a second surfactant to obtain polymer particles. The second surfactant is added in an amount of about 0.1% to about 2.5% by weight of the monomers to generate a stable latex. A preferred range of surfactant is about 0.5% to about 1.0% by weight of the monomers, and must result in an overall surfactant concentration which is less than the critical micelle concentration or "CMC" for the emulsified monomer (s) being used. Both the latex particle size and size distribution are controlled by these conditions, as is well known in the art of emulsion preparations.

The first surfactant used in the conductive material dispersion and the second surfactant in the latex emulsion may be of the same type, i.e., usually of the same class and polarity. Preferably, the first and second surfactants are both anionic and are selected from the group previously listed.

Most preferably, the same surfactant is used in both the conductive material dispersion and latex emulsion.

Polymers suitable for this invention are any suitable polymer or co-polymer composition which retain a suitable particle size for use in a carrier coating as described herein. In a preferred embodiment, a polymethyl methacrylate (PMMA) polymer or copolymer is used as the polymer of the latex emulsion. Suitable co-monomers that may be used to form a PMMA copolymer include, for example, monoalkyl or dialkyl amines such as dimethylaminoethyl methacrylate, diethylaminoethyl methacrylate, diisopropylaminoethyl methacrylate, alkyl acrlates, such as methyl acrylate, or fluoroalkyl methacrylates and acrylates, such as fluoroethyl methacrylate and also methacrylic or acrylic acids and the like. The latex emulsion is preferably formed prior to mixing the latex emulsion into the conductive material dispersion. Thus, polymerization is preferably not formed in-situ in the presence of the conductive material, i.e., the latex is preferably formed in the absence of any conductive materials.

To form the conductive polymer particles, i.e., to incorporate the conductive materials into the polymer particles, the latex emulsion is added to the conductive material dispersion at a metered rate, with metering at about 0.1 to about 5.0 grams per minute, preferably at about 1.5 to about 2.5 grams per minute. The mixing is continued after addition of the final amount of the latex emulsion, such that a stable suspension, of uniform viscosity is produced. Stability of the suspension is illustrated by the lack of separation with minimal settling out of the suspended, conductive particles after standing for several hours. Approximately 0.5 to 5 hours of total mixing time is allowed for this process.

The recovery of the conductive polymer particles from the suspension can be accomplished by processes well known in the art. The drying or isolation of the powder may be carried out by freeze drying, spray drying or other vacuum techniques well known in the art. In a preferred embodiment the suspension is freeze dried to form a fine powder. The conductive polymer particles may then be washed, but in a preferred embodiment, the conductive polymer particles are not washed, thus allowing some amounts of the surfactant to remain in association with the conductive polymer particles. Allowing some amount of the surfactant to remain in association with the conductive polymer particles provides for better sub-micron particle formation and better carrier coating characteristics. It is believed that the surfactants' interplay with the surface chemistry of the conductive polymer particles provides for these improved results In addition to incorporating conductive material into carrier coatings, it is often desirable to impart varying charge characteristics to the carrier particle by incorporating charge enhancing additives, including the addition of other polymer or copolymer resins.

As used in this specification, the term "micro-powder" denotes a powder having a volume median diameter of less than 1 micrometer using a standard Coulter- LS measurement or by other particle sizing determinations and methods well known in the art. The resulting conductive micro-powders obtained from the process have a size of, for example, from about 0.05 micrometers to <1.0 micrometer. Preferably, the micro-powders obtained by the process herein have a size of about 0.1 micrometers to about 0.9 micrometers. Most preferably, the resulting micro-powders obtained by the process herein have a volume median size of about 0.6 micrometers to about 0.8 micrometers.

Following formation, the conductive micro-powders may be used as a carrier coating by coating the micro-powder onto a carrier core.

Thus, in a preferred embodiment, the conductive polymer particles of the present invention are used to coat carriers core materials of any known type by any known method, which carriers are then incorporated with any known toner to form a developer for xerographic printing. Suitable carriers may be found in, for example, U.S. Pat. Nos. 4,937,166 and 4,935,326, incorporated herein by reference, and can include granular zircon, granular silicon, glass, steel, nickel, ferrites, iron ferrites, silicon dioxide, and the like.

Various effective suitable processes can be selected to apply a coating to the surface of the carrier particles. Examples of typical processes for this purpose include combining the carrier core material, and the polymers and conductive component by cascade roll mixing, tumbling, milling, shaking, electrostatic powder cloud spraying, fluidized bed, electrostatic disc processing, and an electrostatic curtain. See, for example, U.S. Pat. No. 6,042,981, incorporated herein by reference. Following application of the polymers, heating is initiated to permit flow out of the coating material over the surface of the carrier core.

The micro-powder coating may be incorporated on to the surface of the carrier core in an amount of, for example, from about 0.3 to about 3.0% by weight. Preferably, the micro-powders may be incorporated on to the surface in an amount of, for example, from about 0.3% to about 2.0% by weight. Most preferably, the micro-powders may be incorporated in an amount of, for example, about 1.0% by weight.

Use of smaller-sized coating powders has proven more advantageous as a smaller amount by weight of the coating is needed to sufficiently coat a carrier core. For example, coating 1% by weight of the powders of the present invention upon a carrier core results in a surface area coverage of, for example, 85–90%, compared to coating with XP-454, which requires at least 3% by weight to get a surface area coverage of 85%. Using less coating is cost effective and results in less coating separating from the carrier to interfere with the triboelectric charging characteristics of the toner and/or developer.

XP-454 is a common carrier coating previously described in the specification. The significant differences between XP-454 and the present invention are the present invention's much smaller size, which permits less coating to be used and provides for better carrier coating surface coverage. Also, in making XP-454, the surfactant used in the process must be washed off to help control the conductivity and minimize adverse charging effects due to surfactant contamination. The present invention does not require this extra step.

Prior art carrier coating particles, such as XP-454 are substantially larger than the present invention. XP-454 has a median diameter of about 2.0 to about 4.0 micrometers whereas the coating resin of the present invention has volume median diameter under 1.0 micrometer.

EXAMPLE I

In this example, the conductive polymer micro-powder is formed from the following process. 1.0 grams of the anionic surfactant dodecyl sulfate-sodium salt available from Aldrich Chemical Incorporated under the trademark Sodium Lauryl Sulfate (SLS) which is added to a stirring solution of 695 grams of distilled water in a glass jacketed vessel. 30 grams of carbon black available from the Cabot Corporation under the trademark Vulcan #XC72R is then added to the stirring solution.

The dispersion of carbon black and surfactant is mixed for 3 hours using a stainless steel blade stirrer operating at 150 revolutions per minute while the solution is maintained at a temperature of 35° C. thereby forming an aqueous dispersion of carbon black and surfactant.

A latex emulsion of polymethyl methacrylate (PMMA) copolymer is separately generated from a monomer base containing 92% methyl methacrylate and 8% methyl acrylate. The latex emulsion contains approximately 0.6 to 0.7 grams of Sodium Lauryl Sulfate (SLS) per 100 grams of the monomers used. This latex emulsion is determined to contain 15% to 25% solids. After the latex emulsion is generated, and its solids level identified, the latex emulsion is then incorporated at a rate of 1.5 grams per minute into the pre-dispersion of carbon black plus surfactant forming a new suspension of carbon black, SLS, and latex.

After the addition of 127 grams of the latex, which is equivalent to approximately 29 grams of polymethyl methacrylate (@22% solids), the addition is stopped and the suspension is mixed for 2 additional hours. The suspension is then filtered through three layers of cheese cloth. This suspension is then freeze dried into a powder having a nominal residual moisture content of 0.5% to 1.5%, as determined by the Karl Fisher method.

An analysis of the powder determines it contains 50% by weight carbon black. Further analysis of the powder by a standard Coulter-LS measurement resulted in a volume median diameter to be 0.610–0.713 micrometers.

The powder is then coated to an EFC-35B safety ferrite core by melt-mixing at a 1% coating weight. Coating coverage is determined by SEM analysis and shows 85–90% surface area coverage.

EXAMPLE II

A micro-powder is prepared identical to Example I, except 15 grams of carbon black is added to the stirring solution.

An analysis of the powder determines it contains 24% by weight carbon black. Further analysis of the powder by a standard Coulter-LS measurement resulted in a volume median diameter to be 0.610–0.713 micrometers.

The powder is then coated to an EFC-35B safety ferrite core by melt-mixing at a 1% coating weight. Coating coverage is determined by SEM analysis and shows 85–90% surface area coverage.

Comparative Example I

In this comparative example, an EFC-35B core is not coated with any powder.

Comparative Example II

In this comparative example, an EFC-35B core is coated with XP-454 powder at 3% coating weight. Coating coverage is determined by SEM analysis and shows 85% surface area coverage.

EXAMPLE III

The coated and uncoated carriers from Examples I–II and Comparative Examples I–II are conditioned overnight in a high relativity environment and a low relative humidity environment using 1.5 grams of toner and 30 grams of the carrier to form developers. The developers are charged by Turbula mixing for 2 minutes and are then analyzed using a standard charge spectrograph to measure displacement. The conductivity of the carriers is also measured using current density at a 100 volt field. The carriers of Examples I–II and Comparative Examples I–II and the developer of Example III, exhibit the following conductivity properties and triboelectric properties that are summarized in Table I:

TABLE I

|   | Comp. Ex. I (EFC-35 Core alone) | Comp. Ex. II EFC-35 Core w/XP-454 @3% cw | Ex. I EFC-35 Core w/Micro-powder @ 1% cw & 50 wt % CB | Ex. II EFC-35 Core w/Micro-powder @ 1% cw & 24 wt % CB |
|---|---|---|---|---|
| Current density @ 100 V field | $8 \times 10^{-8}$ | $8 \times 10^{-6}$ | $9 \times 10^{-6}$ | $5 \times 10^{-9}$ |
| Charge Spectra displacement vs. Standard xerographic toner at high % RH | 2.0 | 5.5 | 4.0 | 5.25 |
| Charge Spectra displacement vs Standard xerographic tone at low % RH | 3.0 to 3.5 | 7.0 | 4.25 | 6.0 |

What is claimed is:

1. A process for manufacturing a conductive micro-powder comprising:
    (i) forming an aqueous dispersion of conductive material and a first surfactant,
    (ii) mixing a latex emulsion comprised of a polymer and a second surfactant into the aqueous dispersion to form a suspension, and
    (iii) recovering the conductive micro-powder from the suspension, wherein the first surfactant and the second surfactant are of the same class and polarity.

2. The process according to claim 1, wherein the conductive material is carbon black.

3. The process according to claim 2, wherein the polymer is polymethyl methacrylate polymer or copolymer.

4. The process according to claim 1, wherein the polymer is polymethyl methacrylate polymer or copolymer.

5. The process according to claim 1, wherein the first surfactant and the second surfactant are anionic.

6. The process according to claim 5, wherein the first and second surfactant are selected from the group consisting of dodecyl sulfate-sodium salt, sodium dodecylbenzene sulfonate, and dodecylnapthalene sulfate.

7. The process according to claim 1, wherein the mixing comprises metering the latex emulsion into the aqueous dispersion at a rate of about 0.1 to about 5.0 grams per minute.

8. The process according to claim 1, wherein the mixing is performed at about 100–200 revolutions per minute for about 2 to 4 hours.

9. The process according to claim 1, wherein the recovering comprises filtering and drying.

10. The process according to claim 1, wherein the recovering includes no washing of surfactant from the conductive micro-powder.

11. The process according to claim 1, wherein the conductive micro-powder has a volume median diameter of about 0.5 micrometers to about 0.8 micrometers as measured by a Coulter-LS measurement.

12. The process according to claim 1, wherein the conductive micro-powder contains about 12 weight percent to about 60 weight percent carbon black.

13. The process according to claim 1, wherein the process further comprises incorporating charge enhancing additives into the conductive micro-powder.

14. A process of producing coated carrier core particles, comprising:
(i) forming an aqueous dispersion of conductive material and a first surfactant,
(ii) mixing a latex emulsion comprised of a polymer and a second surfactant into the aqueous dispersion to form a suspension,
(iii) recovering a conductive micro-powder from the suspension, wherein the first surfactant and the second surfactant are of the same class and polarity, and
(iv) coating a carrier core particle with the conductive micro-powder.

15. The process according to claim 14, wherein the carrier core particle is coated with the conductive micro-powder in an amount of about 1% by weight of the carrier core particle and the coating to obtain a surface area coverage of 85 to 90%.

16. The process according to claim 14, wherein the conductive material is carbon black.

17. The process according to claim 16, wherein the polymer is polymethyl methacrylate polymer or copolymer.

18. The process according to claim 14, wherein the polymer is polymethyl methacrylate polymer or copolymer.

19. The process according to claim 14, wherein the first surfactant and the second surfactant are anionic.

20. The process according to claim 19, wherein the first and second surfactant are selected from the group consisting of dodecyl sulfate-sodium salt, sodium dodecylbenzene sulfonate, and dodecylnapthalene sulfate.

21. The process according to claim 14, wherein the mixing comprises metering the latex emulsion into the aqueous dispersion at a rate of about 0.1 to about 5.0 grams per minute.

22. The process according to claim 14, wherein the mixing is performed at about 100–200 revolutions per minute.

23. The process according to claim 14, wherein the recovering comprises filtering and drying.

24. The process according to claim 14, wherein the recovering includes no washing of surfactant from the conductive micro-powder.

25. The process according to claim 14, wherein the conductive micro-powder has a volume median diameter of about 0.5 micrometers to about 0.8 micrometers as measured by a Coulter-LS measurement.

26. The process according to claim 14, wherein the process further comprises incorporating charge enhancing additives into the conductive micro-powder.

* * * * *